United States Patent [19]

Konno et al.

[11] 4,002,567
[45] Jan. 11, 1977

[54] ULTRAFILTRATION APPARATUS

[75] Inventors: Tsugio Konno; Kohichi Matsumoto, both of Fuji; Shinichi Ohkubo, Tokyo; Yasuo Hashino, Fuji; Kaoru Maeda, Yokohama; Giichi Sayanagi, Kurashiki, all of Japan

[73] Assignee: Asahi Kasei Kogyo Kabushiki Kaisha, Osaka, Japan

[22] Filed: Mar. 25, 1975

[21] Appl. No.: 561,913

[30] Foreign Application Priority Data

Mar. 28, 1974    Japan .............. 49-33988

[52] U.S. Cl. .............. 210/333 R; 210/433 M
[51] Int. Cl.² .............. B01D 31/00
[58] Field of Search .............. 210/22, 333 R, 321, 210/456, 411, 412, 433 M

[56] References Cited

UNITED STATES PATENTS

| | | |
|---|---|---|
| 3,228,877 | 1/1966 | Mahon .............. 210/22 |
| 3,355,382 | 11/1967 | Huntington .............. 210/321 X |
| 3,498,909 | 3/1970 | Littman .............. 210/321 X |
| 3,526,588 | 9/1970 | Michaels et al. .............. 210/23 |
| 3,536,612 | 10/1970 | Kopecek et al. .............. 210/23 |
| 3,616,928 | 11/1971 | Rosenblatt .............. 210/321 |
| 3,746,640 | 7/1973 | Bray .............. 210/321 X |
| 3,794,169 | 2/1974 | Sisk et al. .............. 210/411 X |
| 3,827,976 | 8/1974 | Stana et al. .............. 210/23 |
| 3,853,756 | 12/1974 | Stana .............. 210/412 X |

Primary Examiner—Frank A. Spear, Jr.
Attorney, Agent, or Firm—Armstrong, Nikaido & Wegner

[57] ABSTRACT

An ultrafiltration apparatus comprising a module in which a number of hollow fibers having semipermeable walls, disposed in approximately parallel and collected orderly to form a bundle and fixed with a cast-molding material at at least one end portion thereof, are used as semipermeable membrane, a back washing means and a control means for controlling said module and said back washing means, is presented. Said apparatus can be used for a long time without accompanying reduction of filtration capacity.

1 Claim, 17 Drawing Figures

ULTRAFILTRATION APPARATUS

DESCRIPTION OF THE INVENTION

This invention relates to ultrafiltration apparatus built by using membranes of so-called semipermeable fibers. More particularly, it relates to ultrafiltration apparatus which can be operated without reduction of filtering capacity for a long time by systematizing the ultrafiltering process by incorporating therein an automatical and periodical back washing step in a novel manner; said ultrafiltering process having been used in the past as an industrial separation process only under limitative condition because of its liability of occurrence of blocking and concentration polarization and in turn rapid reduction of filtering capacity.

A term "back washing" herein referred to is an operation which washes the membrane by permeating a liquid in the direction reverse to the direction of the permeation of a liquid through said membrane at the time of filtration.

There have been heretofore known as an ultrafilter, four types: a hollow fiber type, which uses membranes of hollow fibers, a tubular type in which a tubular membrane is spread over the inside surface of a pipe-form porous support, a plate and frame type in which a flat membrane is spread over the plate-form porous support and a spiral type in which a flat membrane and a spacer are wound in the rolled paper form.

Since the hollow fiber type of ultrafilter can take a large effective membrane area per unit volume, its future is considered to be very promising but there has not been heretofore completed nor used any industrial process which is sufficiently reliable so far as we are aware of.

A small laboratory scale apparatus may be commercially available but on account of blocking and concentration polarization during the time of filtration operation, filtering capacity is greatly reduced and the operation of apparatus must be stopped frequently for the purpose of washing. Thus as a commercial scale separation apparatus, it is only used in an application field for products having relatively higher additional value such as purification of medicines or the like. Moreover the hollow fibers used in this apparatus had only a poor mechanical strength and cannot endure the severe operation which brings about strong physical deformation such as repetitive back washings. Moreover commercial apparatuses are not so constructed as being fit to a back washing.

Tubular type apparatuses are now being used in an industrial scale separating process most frequently. Since tubular apparatuses have module of simple construction, it is good for the treatment of liquid containing a large amount of sludge. Since it is fit to flow a liquid to be treated, at a high speed, it has such characteristic features that concentration polarization layer can be made thinner, the reduction of filtering capacity can be prevented and a relatively stable operation can be continued for a long time, but it has such large defects that the operation must be stopped once every 15 to 30 days to wash the surface of membrane and thus it is only adapted to the treatment of extremely stable liquid which does not form any concentration polarization layer which may brings about coagulation on the surface of membrane or blocking of the membrane. Further since tubular type apparatuses have a structure in which a membrane is spread over the inside surface of a porous pipe, the membrane is liable to separate from the support under the application of a back washing and in this regard a back pressure cannot be applied.

Plate and frame type apparatuses have a feature that cost for changing an ultrafilter membrane is lower but since they have defects in that the frame which is the principal part of this apparatus is precise and expensive handicrafts and requires high grade of technique in respreading a membrane and the operation thereof is complicated, they have hardly been used in an industrial scale process. In this type also, since a membrane is only supported by a porous support on the back side, a back washing cannot be applied because it breaks the membrane. In order to make the structure fit to back washing, it may be possible to hold both the surfaces of the membrane with porous supports. However it is well known that such a structure forms extremely thick concentration polarization layer of treating substance in a to-be-treated liquid on the surface of the membrane at the time of filtration, and hence filtration operation cannot be carried out.

Spiral type apparatuses are made by laying reticular spacers on the inside and one of the outsides of long bag-form semipermeable membrane and winding them as in a roll of paper and have the feature that a large effective area of membrane can be taken per unit volume but since sludge is liable to deposit within the spacer this type cannot be used for a to-be-treated liquid containing sludge. Since the end part of bag-form semipermeable membrane, in case of blockage of membrane or deposit of filter sludge in layer form, breaks if back washing is applied, there is no means for restoration. Accordingly they can be applied only to an extremely stable to-be-treated liquid which does not coagulate on the surface of membrane nor form any concentration polarization layer which may block the membrane.

As above-mentioned, there have been no pertinent technique applied to prevent the blockage and deposit of filter sludge in any type of prior art apparatuses and hence these apparatuses cannot be used in a stable long time continuous operation of industrial process and they have been used only in special field.

It is an object of the present invention to provide an apparatus of ultrafilter having advantage in cost, which can be operated continuously in a stabilized manner for a long period of time by improving the above-mentioned basic drawbacks of prior ultrafiltration apparatus systematically.

It is another object of the present invention to provide a method of ultrafiltration which can be carried out without accompaniment of rapid reduction of filtration capacity and further wherein filtration capacity can be restored by back washing.

The above-mentioned objects can be attained according to the apparatus and the method of the present invention.

The ultrafiltration apparatus of the present invention comprises a module in which a number of hollow fibers having semipermeable wall, disposed in approximately in parallel, and collected orderly to form a bundle and fixed with a cast-molding material at at least one end portion thereof, are used as semipermeable membrane, a back washing means and a control means for controlling said module and said back washing means.

The semipermeable hollow fibers useful in the apparatus of the present invention must have each a hollow part penetrating from one end of the fiber to the other and the mechanical strength sufficient to endure the pressure exerted from the outside and inside of each hollow fiber.

In the specific examples of the present invention hereinafter offered, hollow fibers made from a synthetic high molecular weight material consisting mainly of acrylonitrile but hollow fibers of any kind of raw materials such as cellulose acetate, polysulfone or the like can be used in the apparatus of the present invention so long as they have sufficient mechanical strength.

There are two kinds of module and module cartridge useful in the apparatus of the present invention i.e. outside pressure type and inside pressure type.

In the accompanying drawings, the preferred embodiments of the invention are illustrated, in which.

Figures 1, 2, 3:
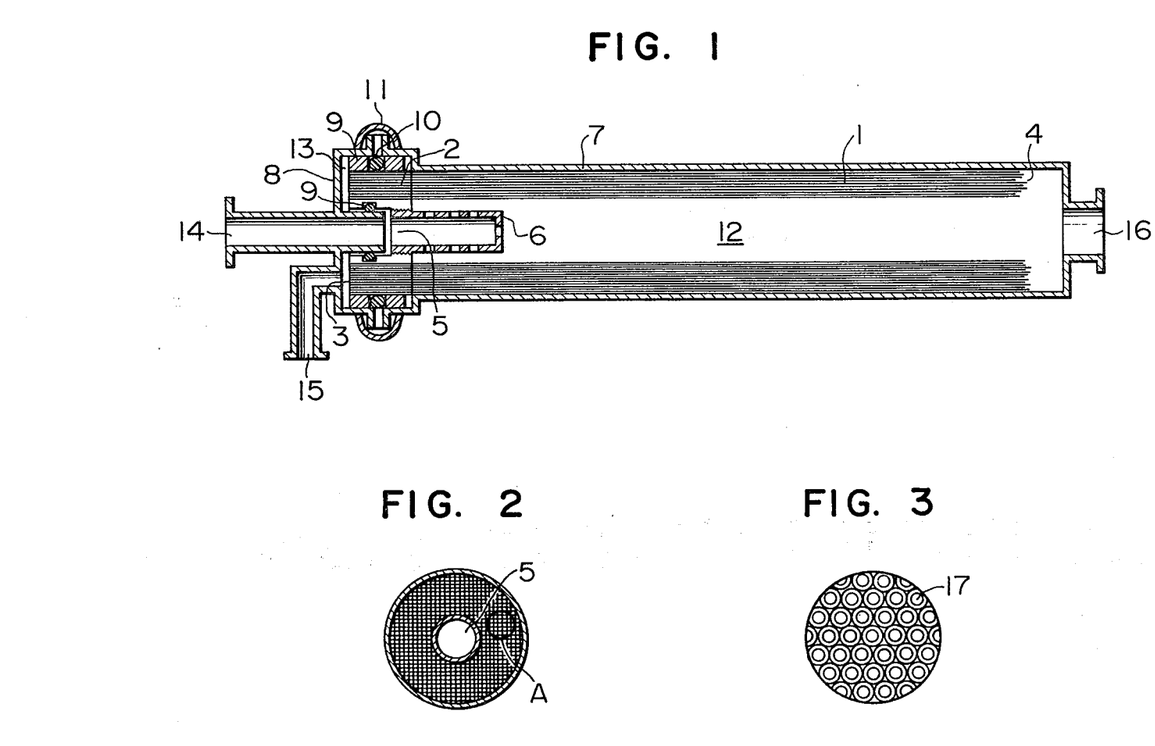
FIG. 1 is a schematic view of an outer pressure type module in the section along the central line thereof showing the inner structure.
FIG. 2 is a schematic view in the section vertical to that of FIG. 1 showing the opened surface of hollow fibers in an outer pressure type module cartridge.
FIG. 3 is an enlarged view of the part of FIG. 2 indicated by "A".

One example of outside type module and module cartridge is illustrated in FIGS. 1, 2 and 3.

In FIG. 1, numeral 1 is a bundle of hollow fibers. 2 is a part in which fibers are collected orderly to form a bundle and fixed with a cast-molding material. At the left end of the fixing part of the bundle of fibers in FIG. 1, the hollow fibers are opened. FIG. 2 illustrates the surface on which the hollow fibers are opened at the fixed end of the bundle of fibers. On the other end part 4, the hollow fibers are not mutually fixed providing free ends and moreover, the hollow fibers are not opened at this end part. 5 is a port for feeding a to-be-treated liquid. At the outlet of this port, there is provided a nozzle 6. This feeding port 5 for the to-be-treated liquid, is situated at the central portion of the end part where the hollow fibers are collected orderly to form a bundle and fixed. As for the length of nozzle, the shorter, the better. The part ranging from 1 to 6 is called a module cartridge and so constructed that it is accommodated in a casing body 7 and replaceable easily by removing a casing cap 8. 9 is a packing, 10 is a plastic ring and 11 is a band coupling. By aid of these 9 to 11, a chamber 12 for a to-be-treated liquid and a chamber 13 for the liquid permeated through hollow fiber membranes form a liquid-tight structure having the walls of hollow fibers as partition. Namely a liquid to be treated enters the chamber 12 for the to-be-treated liquid from the entrance 14 for the to-be-treated liquid, through the feeding port 5, and the nozzle 6. A part of the component capable of permeating the hollow fiber wall passes, after permeating, into the hollow part of the hollow fibers. It is collected in the chamber 13 for the liquid permeated through the hollow fiber walls and withdrawn from the outlet 15 for the permeated liquid. On the other hand, the liquid containing the concentrated component incapable of permeating the hollow fiber walls is withdrawn from the outlet 16 for the concentrated liquid of impermeable component. FIG. 3 is an enlarged view of the part A having a O mark in FIG. 2, and 17 is the opening part of hollow fibers.

An inside pressure type module has a structure in which a liquid to be treated is sent under pressure into the hollow part of hollow and the permeated liquid having undergone ultrafiltration by way of the inside surface of hollow fibers is withdrawn from the outside surface. One example of such a structure is shown in FIGS. 4 and 5.

Figure 4:
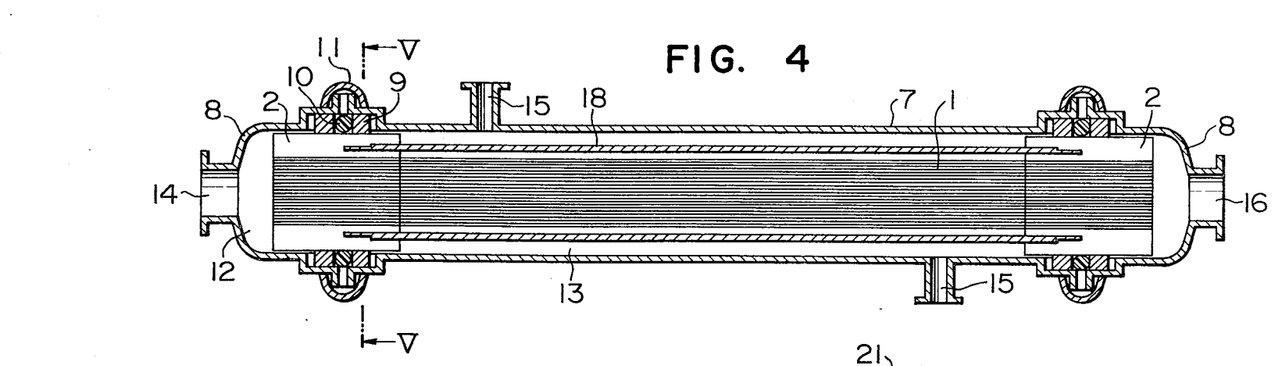
FIG. 4 is a schematic view of an inner pressure type module in the section along the central line thereof showing the inner structure.

In FIG. 4, 1 is a hollow fiber bundle, 2 is a part in which fibers are collected orderly to form a bundle and fixed with a cast-molding material. In FIG. 4, hollow fibers are opened at the right end of the right side part where the fibers are collected and fixed. They are opened also at the left end of the left side part where the fibers are collected and fixed.

Figure 5:
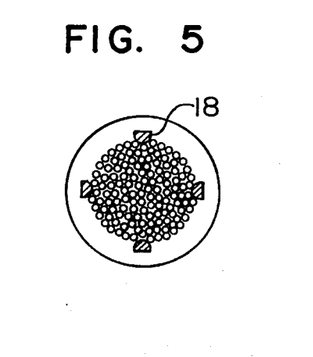
FIG. 5 is a cross-sectional view of the module of FIG. 4 along the line V—V.

FIG. 5 is a cross section of a cartridge taken along line V—V of FIG. 4. 18 are supporting members made of round stainless steel bars which are fixed at two fixing parts, situated in parallel to the hollow fibers and serve to prevent the hollow fibers from bending. The parts indicated by 1, 2 and 18 are called module cartridge, accommodated in a casing body 7 and so constructed that they are readily exchangeable by removing a casing cap 8. 9 is a packing, 10 is a plastic ring and 11 is a band coupling. By aid of these 9 to 11, a chamber 12 for a to-be-treated liquid and a chamber 13 for the liquid permeated through the hollow fiber membranes form a liquid-tight structure having the walls of hollow fibers as partition. Namely a liquid to be treated is sent under pressure into the hollow part of hollow fibers from the entrance 14 of the liquid to be treated and one part of the component permeable through the hollow fiber walls permeates the hollow fiber walls and exudes outside the hollow fibers. It is collected in a chamber 13 for the liquid permeated through the hollow fiber membranes and withdrawn from the outlet 15 for the permeated liquid. On the other hand, the concentrated liquid of the component impermeable through the hollow fiber walls is withdrawn from the outlet 16 for the concentrated liquid of impermeable component.

Each two examples for outside pressure apparatus and inside pressure apparatus will be illustrated by referring to the flow diagram of ultrafiltration apparatus of the present invention.

Figure 6:
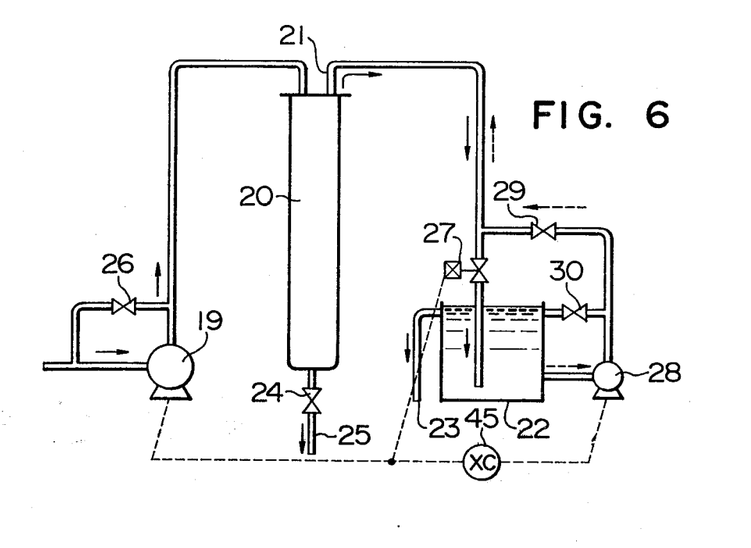
FIG. 6 shows a flow sheet of one embodiment of outer pressure type apparatus.

FIG. 6 shows an apparatus which is the outside pressure type and constructed to stop a feed pump during back washing time.

Figure 7:
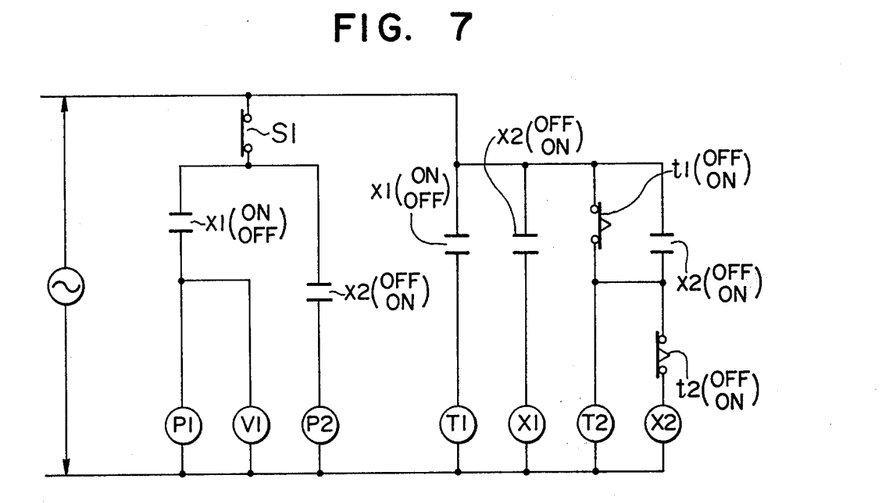
FIG. 7 shows a circuit for controlling the apparatus of FIG. 6.

A liquid to be treated is delivered to an outside pressure type module 20 by a feed pump 19. Among the liquid to be treated delivered to the inside of the module, one part of the component capable of permeating the hollow fiber walls, permeates the hollow fiber walls and gathers in the outlet 21 for the permeated liquid. After filling up a storage tank 22 for the permeated liquid for back washing, it is overflown therefrom and withdrawn to the outside of the apparatus from the outlet pipe 23 for the permeated liquid. On the other hand, a concentrated liquid of impermeable component to the hollow fiber membrane passes through a back pressure valve 24 and is withdrawn from the outlet pipe 25 for withdrawing the concentrated liquid of impermeable component Setting of filtration pressure is made with a pressure controlling valve 26. Setting of magnification ratio of concentration in one path is carried out with a back pressure valve 24. During the time of back washing, a feed pump 19 is stopped, an electromagnetic valve 27 (automatic opening and closing valve) is closed, a back washing pump 28 is actuated, the back washing liquid is sent under pressure into a module from a storage tank 22 of a permeated liquid for back washing in the direction shown by an arrow mark of dotted line and back washing is carried out from the hollow part of the hollow fibers to the outside thereof. 29 is a non-return valve, having a construction which allows the flow in the direction of arrow mark of dotted line but does not in the reverse direction, serving the function for preventing air from entering the pump at the time of suspension of the back washing pump. At the time of back washing, one part of back washing water returns through a pressure regulating valve 26 or a feed pump 19 to the side of the to-be-treated liquid and another is passed through the outlet pipe 25 for the concentrated liquid of impermeable component and mixed with the liquid on the side of concentrated liquid. 30 is a valve for controlling back washing pressure. 45 is a sequence control apparatus which controls the functions of pumps 19 and 28 and an electromagnetic valve 27 by time. FIG. 7 is a control circuit for automatic back washing of the apparatus shown in FIG. 6.

In FIG. 7, S1 is a main switch, P1 is a feed pump, V1 is an electromagnetic valve, P2 is a back washing pump, T1 is a time switch for setting filtration time, t1 is its contact. T2 is a time switch for setting back washing time and t2 is its contact. X1 is a relay switch and $x1$ is its contact. $x1$ has a mechanism which turns $x1$ to "ON" when current does not flow through X1 and to "OFF" when current flows therethrough. X2 is also a relay switch and $x2$ is its contact. $x2$ turns to ON when current flows through X2 and to OFF when current does not flow therethrough.

Description will be given as to the functional mechanism of this control circuit. In the drawing, letters of ON and OFF attached to each contact indicate that the state is in filtration time when it is described on the upper line and in back washing time when it is described on the lower line. At first when main switch S1 is turned to ON, the feed pump P1 is actuated, the electromagnetic valve V1 is opened during the current flow and filtration is carried out. At the same time a timer for filtration (time switch) T1 is energized, and starts running during the time set by the timer T1 for filtration e.g. 40 minutes in case of Example 1. When the set filtration time is over, the time switch acts to turn the contact $t1$ to ON. When $t1$ turns to ON, the timer T2 for back washing is energized to turn $t2$ to ON, to bring the relay switch X2 to the current flow state and its contact $x2$ to ON. When $x2$ turns to ON, the back washing pump P2 starts running. At the same time, the relay switch X1 is brought into the state of current flow, $x1$ turns to OFF, the feed pump and the timer for filtration are brought to unenergized state and the time switch of the timer returns to the starting position (zero time position). The electromagnetic valve VI is brought to no-current state and the flow path of FIG. 6 is closed. When the timer T2 for back washing (e.g. 30 seconds in case of Example 1) is over, $t2$ turns to OFF, X2 to no-current state $x2$ to OFF, and the back washing pump is stopped. At the same time, X1 is brought to no-current state, $x1$ turns to ON, the feed pump and the electromagnetic valve are actuated and simultaneously T1 turns to current flow state, $t1$ to OFF, T2 is suspended and the time switch returns to the starting position. A series of these operations is repeated by the repetition of times set by the timers to carry out automatically the filtration and the back washing e.g. at the time interval of 40 min. in case of filtration and 30 sec. in case of back washing in case of Example 1.

Figure 8:
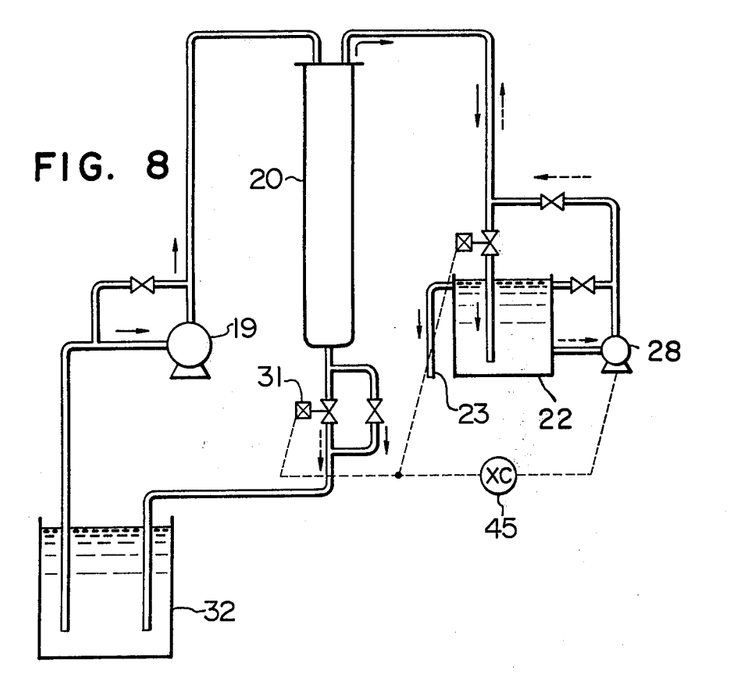
FIG. 8 shows a flow sheet of another embodiment of outer pressure type apparatus.

In FIG. 8, all the elements are same with those of FIG. 6 except the electromagnetic valve (pressure releasing valve) 31 but this apparatus is suitable to the treatment of a kind of liquid having a problem in that the removal of the filtration sludge deposited on the surface of hollow fiber membranes is difficult. It is an apparatus so designed that pressure is released by fully opening the electromagnetic valve 31 while keeping a feed pump in running at the time of back washing and back washing is carried out simultaneously with the washing of the surface of membrane with high speed liquid. 32 is a tank for the liquid to be treated. In case of batch concentration, back washing is carried out periodically and automatically (in general 30 minutes filtration and about one minute back washing) while circulating the liquid to be treated in the inside of a module 20 with a feed pump 19 and the permeated liquid is simultaneously withdrawn from the outlet 23 for the permeated liquid, concentration ratio is calculated from the recorded values of withdrawn amount of the permeated liquid and thus the concentrated liquid is obtained in the tank 32.

Figure 9:
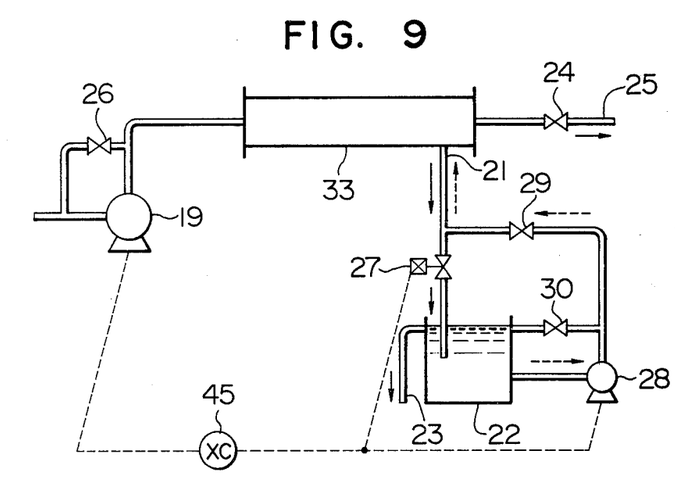
FIGS. 9 and 10 show flow sheets of embodiments of inner pressure type apparatus, respectively.

FIG. 9 shows an inside pressure type apparatus in which a feed pump is stopped during the time of back washing. A liquid to be treated is delivered to an inside pressure type module 33 with a feed pump 19. The to-be-treated liquid delivered to the inside of the module is introduced in the hollow part of hollow fibers among which one part of the component capable of permeating the hollow fiber walls exudes outside the hollow fibers, after permeation through the hollow fiber wall, gathers in the outlet 21 of permeated liquid and after filling up a storage tank 22 for the permeated liquid for back washing, it is overflown therefrom and withdrawn to the outside of the apparatus from a withdrawn pipe 23 for the permeated liquid. On the other hand, a concentrated liquid of the component impermeable through the hollow fiber membranes passes through a back pressure valve 24 to be withdrawn from the outlet pipe 25 for the concentrated liquid of impermeable component. Setting of filtration pressure is made by way of a pressure-controlling valve 26. Setting of concentration ratio for one path is made by way of a back pressure valve 24. During the time of back washing, the feed pump 19 is stopped, the electromagnetic valve 27 is closed, a back washing pump is actuated, back washing liquid is sent under pressure from the storage tank 22 for the permeated liquid for back washing in the direction shown by an arrow mark of dotted line into the module and back washing is carried out from the outside of the hollow fibers to the inside of the hollow part. 29 is a non-return valve having such a construction that it allows the flows only in the direction shown by the arrow mark of dotted line, serving to prevent air from entering the back washing pump during the time of suspension of the back washing pump. During the time of back washing, one part of back washing water passes through a pressure-controlling valve 26 or a feed pump 19 to return to the side of the liquid to be treated and another passes through the outlet pipe 25 for withdrawing the concentrated liquid of impermeable component to be mixed with the liquid on the side of concentrated liquid. 30 is a valve for controlling a back washing pressure. 45 is a sequence control apparatus which controls the functions of pumps 19 and 28 and an electromagnetic valve by time.

Figure 10:
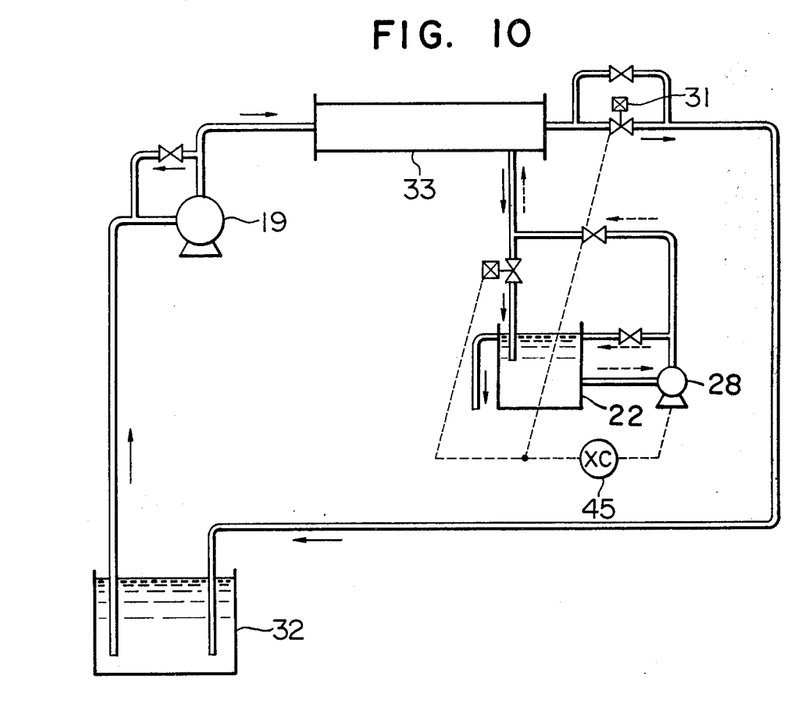

In FIG. 10, elements of the apparatus are all same with those of FIG. 9, but this is an inside pressure type apparatus fit to those of the to-be-treated liquid which produce filtration sludge difficult to remove in the hollow part of hollow fibers.

The outside pressure type system is fit to the ultrafiltration of a to-be-treated liquid which is a high viscous fluid containing a large amount of sludge.

An inside pressure type apparatus is fit to be used in the fields of foodstuff and medical supplies in which retention of liquid in the inside of the apparatus should be avoided and moreover disinfection of apparatus is necessary i.e. the apparatus used in the fields which requires the fulfilment of sanitary specification. The most suitable interval of time for back washing can be calculated by measuring filtration curve (relationship between percent water permeability and time), and formulating a filtration equation by graphical integration with a computer but it is in the extent of once in every 15 minutes to 2 hours. Back washing is usually carried out for 1 minute.

The feature of the present invention resides in the back washing carried out with permeated water. Particularly in case of laticies which form concentration polarization layer liable to coagulate, a long time stabilized operation of ultrafiltration cannot be performed unless the method of the present invention is used.

Hereinafter detailed description will be given with regard to the cases where the apparatus according to the present invention is applied to concentration method of laticies (a term latex or laticies will be used hereinafter throughout this specification to means latex or emulsion of various polymers or copolymers of vinyl acetate, styrene, methyl methacrylate, methyl acrylate, butadiene, isoprene, vinyl chloride, vinylidene chloride or the like) of which desired concentration cannot be attained on account of the problem relative to the production process, concentration method of dilute latex spent liquor or concentration method of latex compound included in the water used for washing tanks, pipings, etc. in latex finishing process.

According to the apparatus of the present invention, concentration of latex can be carried out without exerting an excessively thermal, mechanical and electrical action upon latex itself.

Among concentration methods of latex, there have been heretofore known a centrifugal separation method, a creaming method, an electrical decantation method, a vaporization method or the like but they are all the concentration methods which are carried out under the operation condition neglectful of stability of latex e.g. mechanical, thermal or electrical stability. The application field has been restricted only to the extent of latex of natural rubber. It has not been suitable to those laticies such as that of synthetic rubber which has delicate properties. Among the methods capable of concentrating latex under a lighter, mechanical, thermal or electrical load, a method which relies on filtration is superior in general but since a latex has particle size to the extent of 0.01 to several $\mu$ in general, the filtration cannot be carried out with a customary filter material. Application of an ultrafiltration membrane is conceivable to this extent of particle size. In reality, there is a report relative to the concentration of latex with an ultrafilter (Industrial Water Engineering, 1971, June/July, P18). However, in the operation of an ultrafilter, there is formed on the surface of the membrane, a layer having an extremely high concentration of latex, which is called a concentration polarization layer. This reduces greatly the amount of permeated liquid or forms a latex coating on the surface of the membrane as if it is tightly spread, and breaks the emulsion resulting in the complete loss of filtering function. As an effective means for cancelling the concentration layer, there is an attempt to keep the surface of ultrafilter in the state of turbulent flow (e.g. B. J. Weirsman et al, Chemical Engineering Progress Symposium Series Vol 61, No. 90, P285). However, latex turns to extremely unstable state in a violent stream capable of forming the turbulent flow state, resulting in the coagulation of latex. The reason of no example of long time stabilized operation on commercial scale for ultrafilter is due to the unsolved problem of the above-mentioned concentration polarization layer even though it has sufficient power for concentrating latex from the viewpoint of its capacity.

The apparatus of the present invention is characterized in that it comprises a module having a structure capable of performing back washing and further one part of an excessive amount of dispersing agent in a latex is permeated therethrough in the state dissolved in the permeating liquid and back washing is carried out periodically with the permeated liquid containing the dispersing agent.

The dispersing agent herein referred to is an anionic surfactant, a nonionic surfactant, a cationic surfactant or a mixture thereof which is used generally in emulsion polymerization.

The concentration of the dispersing agent in the permeated liquid will be sufficient if it is in the range of 20 – 1000 ppm in case of latex of common synthetic rubber such as SBR latex, NBR latex or the like. As an ultrafilter, those having a limit of molecular weight for filtration to the extent of 500 – 200,000 are useful, but, in the concentration of common latex, an ultrafilter having a limit of molecular weight for filtration to the extent of 1000 – 40,000 is suitable. In a common latex, there is incorporated, a considerably excessive amount of dispersing agent. The change of concentration of dispersing agent included in a permeated liquid hardly occurs during the time of concentration but it is the condition for maintaining the concentration of dispersing agent in a permeated liquid at a constant value that a dispersing agent in 1.2 times or more the amount necessary for common latex is included in the latex for concentration.

Frequency of periodical operation of back washing with a permeated liquid containing a dispersing agent will be sufficient if it is to such an extent that it can prevent the formation of the concentration polarization layer on the surface of an ultrafilter membrane in the form of a coating. Highest frequency will be one time of 0.5 minute of back washing after every 10 minutes of filtration though actual frequency varies depending upon concentration of latex and capability of forming a coating of latex.

In case of concentration of latex carried out in batch operation, among the latex concentrated to a high concentration during the time of suspension, those remaining on the surface of membrane of an ultrafilter form coating and give harmful influence on the concentration of subsequent batch. However, according to the apparatus of the present invention, ultrafiltration capacity can be maintained by maintaining the surface of the membrane of ultrafilter within a latex concentration having no liability of forming a coating. To be more concretely, the above-mentioned state can be attained by washing the surface of membrane of ultrafilter with the latex used in batchwise concentration and carrying out simultaneously back washing with the permeated liquid in order to remove the concentration polarization layer formed on the surface of membrane of the ultrafilter.

The apparatus of the present invention will be illustrated in specific examples hereinafter but the apparatuses used in the specific examples will be described referring to the drawings at first.

Figure 11:
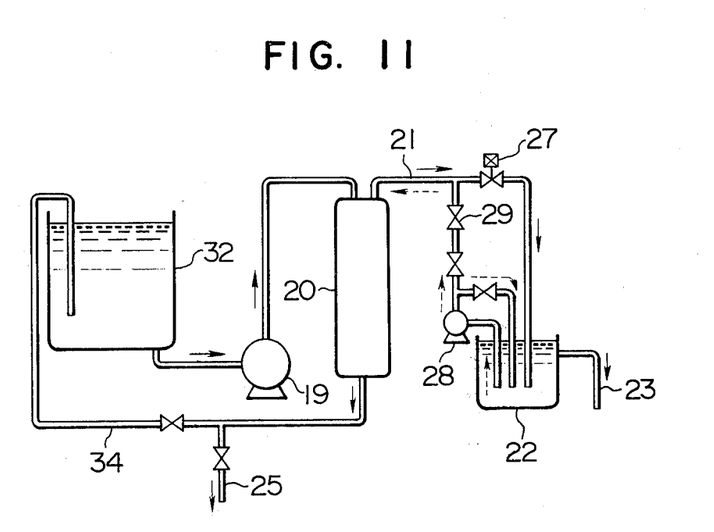
FIG. 11 shows a flow sheet of outer pressure type apparatus used in a batch process.

FIG. 11 is a flow sheet of an outside pressure type concentration apparatus useful in a batch process.

32 is a tank for latex to be concentrated. The latex to be concentrated stored in the tank 32 is introduced in a module 20 by a pump 19 under a constant pressure and the permeated liquid enters a permeated liqud tank 22 through a permeated liquid piping 21 and an automatic valve 27. Concentrated latex returns to the tank 32 through pipings 34. A pump 28 is for back washing. It is actuated during the time of back washing. By closing the automatic valve, the permeated liquid is returned to the module 20 through a piping 21 to do back washing. 29 is a non-return valve, 23 is a withdrawal pipe for the permeated liquid and 25 is an outlet for withdrawing concentrated liquid.

Figure 12:
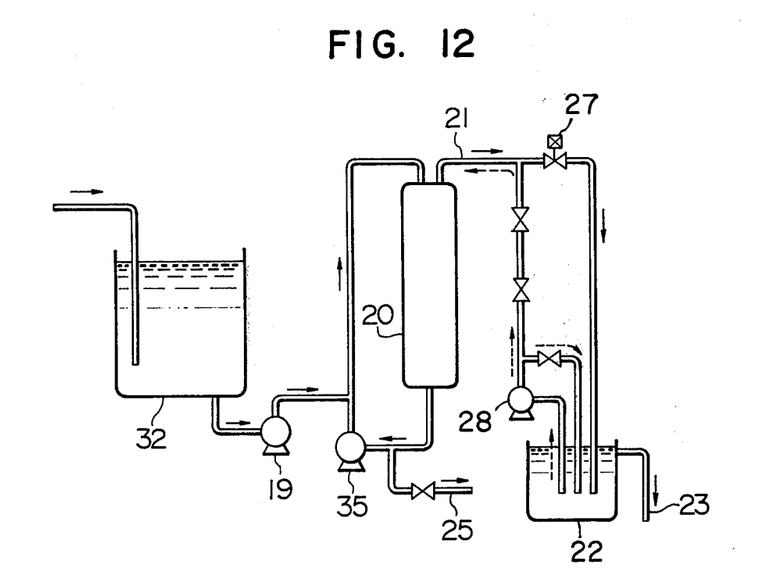
FIG. 12 shows a flow sheet of outer pressure type apparatus used in a continuous process.

FIG. 12 is a flow sheet of an outside pressure type concentration system useful in a continuous process.

32 is a tank for latex to be concentrated. A determined amount of the latex inside the tank 32, i.e. the total of the amounts discharged from the outlet pipe for the permeated liquid 21 and the outlet pipe for the concentrated liquid 25, is delivered into a module 20 under a fixed pressure. 35 is a circulation pump which performs the function for circulating a definite amount of the latex concentrated in a certain ratio, into the module 20. Accordingly, concentration ratio is determined by the ratio of the concentrated latex discharged from the piping 25 and the permeated liquid discharged from the piping 23. Other points of back washing circuit of FIG. 12 are same with those of FIG. 11.

Description will be given to a conventional ultrafiltration apparatus used in the comparative examples hereinafter described.

As a tubular type apparatus, a commercially available module supplied from A company was used. A membrane was spread over the inside of a pipe having a diameter of 2.54 cm and made of porous material of cellulose acetate. The module has an inside diameter of 2.54 cm, a length of 130 cm and an effective membrane area of 0.1 m².

As a plate and frame type apparatus, a commercially available module supplied from D company was used. This was built by assembling a plurality of water permeable thick papers like plates whose insides are hollow and connected to a pipe penetrating the central parts of all the plates to form an assembled structure like a radiator having fins. The surfaces of the plates were covered with semipermeable membranes. The material of the semipermeable membrane was not clear. A module was of rectangular prism having a cross-section of 5.1 cm × 7.6 cm, a length of 31 cm and an effective membrane area of 0.18 m².

As spiral type apparatus, a module supplied from P company was used. The material of membrane was cellulose acetate. It had a diameter of 9 cm, a length of 52 cm and an effective membrane area of 2.7 m².

Figure 16:
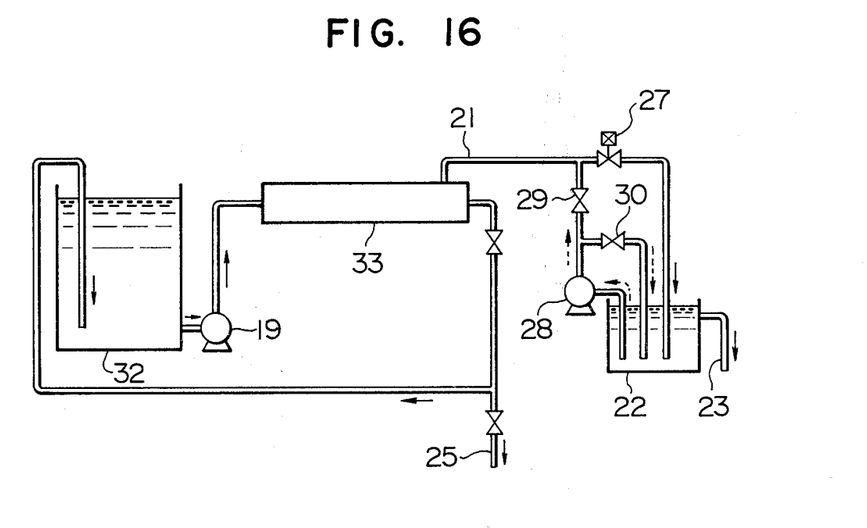
FIG. 16 shows a circuit diagram of inner pressure type of batch concentration apparatus.
Figure 17:
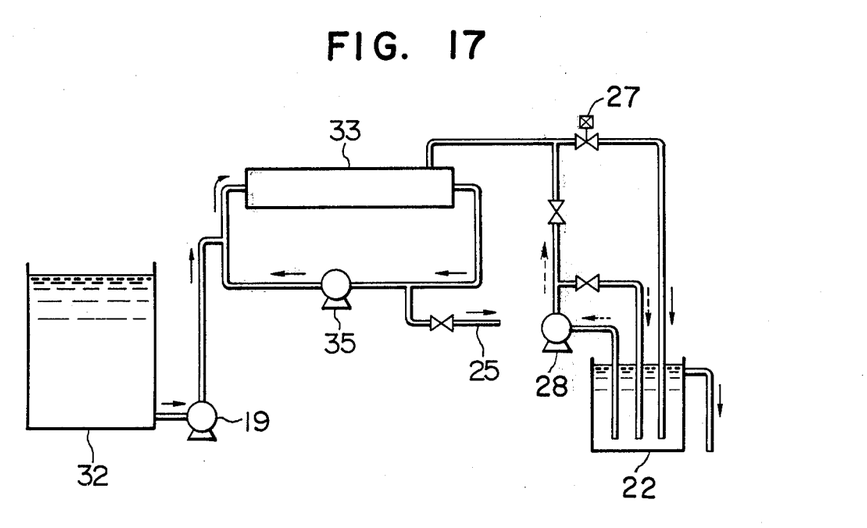
FIG. 17 shows a circuit diagram of inner pressure type of continuous concentration apparatus.

FIG. 16 is a circuit diagram of inside pressure type batch concentration apparatus and FIG. 17 is a circuit diagram of inside pressure type continuous concentration apparatus. The flow of liquid, function of apparatus, etc. in FIG. 16 correspond to those in FIG. 11 and those in FIG. 17 correspond to those of FIG. 12.

EXAMPLE 1

Three % by weight of latex of styrene-butadiene copolymer (50:50) was batchwise concentrated up to 20% by weight, according to the flow sheet shown in FIG. 11 and using a module mentioned below. In a module, hollow fibers having an outer diameter of 1.3 mm and an inner diameter of 0.7 mm, prepared from an acrylonitrile polymer, was used. The permeability of the hollow fibers for pure water was 4 m³/m²·day·atm (the area of membrane was calculated from the outer wall surface). These hollow fibers were disclosed in detail in Japanese patent laid-open publication No. 90684/1974. 2,500 hollow fibers having each an effective length of 700 mm and in total an effective membrane area of 7.5 m² were held in one module. This module is an outer pressure type shown in FIG. 1. One end of each hollow fiber is not opened and the other end thereof is not fixed to each other thereby forming a free end. The feed inlet of the liquid to be treated to the module is located at the center of the end part of the side of the module where hollow fibers are collected orderly to form a bundle and fixed. The length of the part of feed nozzle protruding from the end where the fibers are collected in order and fixed was 0.15 m. The treatment volume per one batch was 3 m³ in case of 3% by weight of latex, and 0.5 minute and 40 minutes were set for back washing and filtration, respectively. Permeated liquid was used as back washing liquid, and the concentration of dispersing agent of latex (a mixture of sorbitan-monolauric acid ester and polyoxethylene sorbitan-monolauric acid ester in a ratio of 1:1) in the permeated liquid during the concentration was 70 – 100 ppm. In addition, during the back washing, forced stirring of the liquid to be treated, etc. on the filtration surface of hollow fibers was not particularly carried out, and only during the time of filtration, the flow rate of the liquid to be treated, on the surface of hollow fibers, was adjusted so as to give 0.7 m/sec. or higher. The ultrafiltration membrane unit according to the process of the present invention was repeated 90 times or more. The time required for concentrating one batch was 16 – 18 hours.

COMPARATIVE EXAMPLE 1

Figure 13:
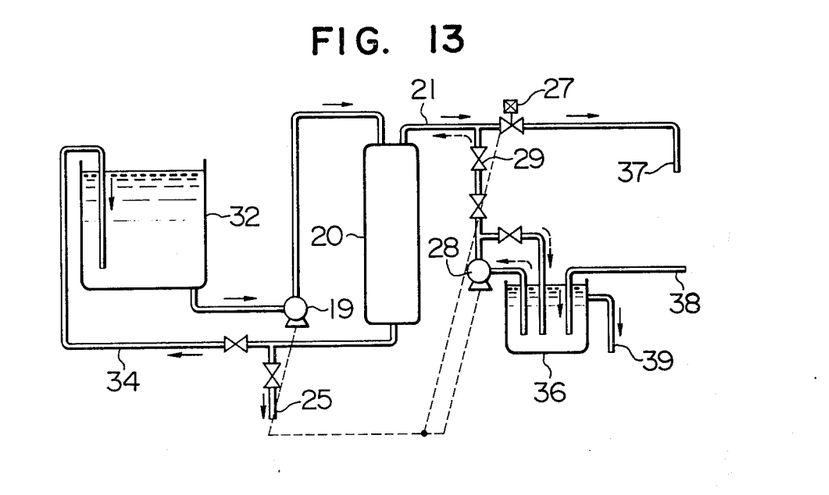
FIG. 13 shows a flow sheet of an apparatus of back washing type which uses pure water (deionized water).

A concentration test was carried out using the same latex as in Example 1 and the back washing means which uses pure water (deionized water), as shown in FIG. 13. The same module as in Example 1 was employed. In FIG. 13, 36 is a tank for back washing liquid (water). 37 is an outlet for the permeated liquid. 38 is a piping for pure water for back washing. 39 is an outlet of back washing water overflow. This operation was carried out under entirely the same operation conditions as in the case of back washing by means of the permeated liquid, except that the permeated liquid was all discharged and back washing was carried out using fresh pure water (deionized water). The resulting aqueous solution of styrene-butadiene latex concentrated up to 20% by weight was very poor in the stability of latex, and a large amount of coagulated matter was mixed therein. Thus the solution was not of a quality good for reuse. Further, coherent rubbery latex accumulated between hollow fibers of the module. Thus after completing concentration in the third time batch, the water-permeability of the module decreased down to about one thirds of the initial value. Even when back washing cycle was shortened and the back washing time was extended, the permeability was not restored.

COMPARATIVE EXAMPLE 2

Figure 14:
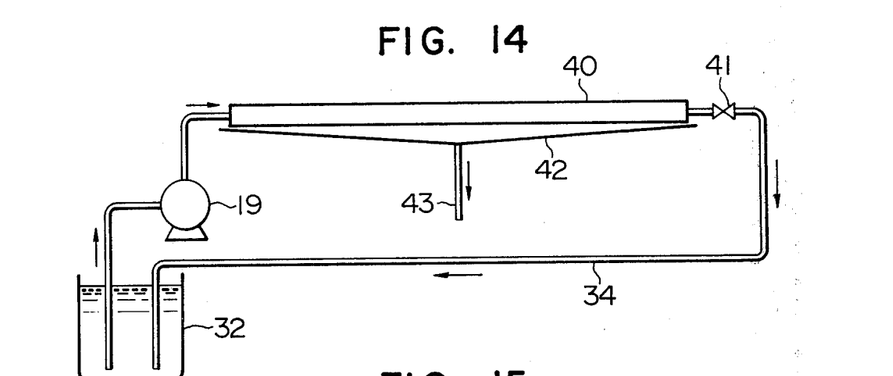
FIG. 14 shows a flow sheet of an apparatus using a tubular type module.

The same latex as in Example 1 was concentrated using the system supplied by a company A shown in FIG. 14 wherein a tubular type module was employed. In FIG. 14, the latex liquid is fed from a raw solution tank 32 into a module 40 by means of a feed pump 19. Numeral 41 means a back pressure valve. The liquid concentrated by the module 40 is returned to the original solution tank 32 via returning pipe for the concentrated solution 34. On the other hand, a transparent liquid composed mainly of water, which permeated through the membrane of hollow fibers inside module 40, exuded from a porous pipe supporting the membrane of the module, gathered in a receiver of permeated solution 42 and discharged from a discharge pipe of permeated solution 43 to the outside of the apparatus. Thirty liters of 3% by weight aqueous latex was concentrated up to 20% by weight. The resulting concentrated liquid of latex had a large amount of coherent matter mixed therein and could not be reused as latex. The time required for the concentration was about 20 hours. Further when the concentrating operation of the second time batch was carried out, the time required for the concentration up to the same 20% by weight was 40 hours, i.e. twice the above-mentioned time, and yet the resulting concentrated solution contained a further larger amount of coherent matter mixed therein, than that in the first time batch. When a back pressure was applied to this module, the membrane separated from its support. Thus back washing was not carried out.

COMPARATIVE EXAMPLE 3

Figure 15:
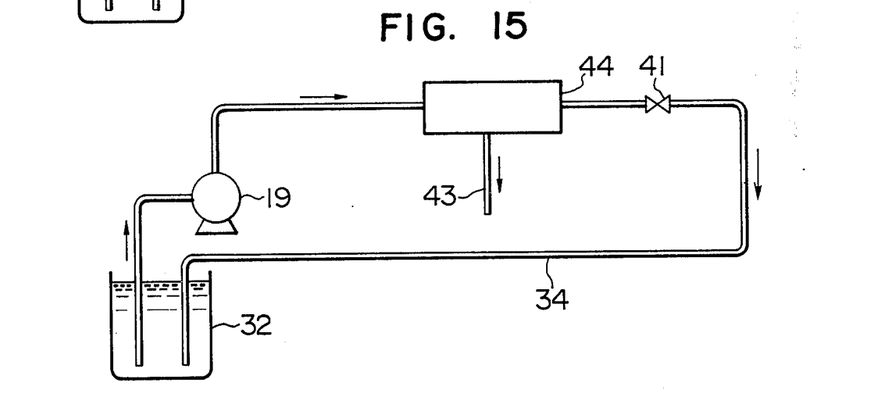
FIG. 15 shows a flow sheet of an apparatus using a plate and frame type or spiral type module.

Three % by weight latex of styrene-butadiene copolymer in a ratio of 50:50 as in Example 1 was concentrated using the apparatus supplied from a company D shown in FIG. 15 wherein a plate and frame type module was employed. In FIG. 15, the solution to be concentrated is fed from a raw solution tank 32 into a module 44 by means of a feed pump 19. When the solution is passed through this module, a part of permeable component is permeated through the membrane and is taken out to the outside of the apparatus through the discharge pipe for permeated solution 43. On the other hand, concentrated raw solution is returned to a raw solution tank 32 via a back pressure valve 41 and a returning pipe for concentrated solution 34. When 80 L of a latex was concentrated up to 20% by weight, the time required for concentrating in the first time batch was 28 hours. The resulting 20% by weight latex had a large amount of coherent matter mixed therein, and was not of a quality endurable for reuse. Further, when concentration operation of the second time batch was carried out, the time required for the concentration up to the same 20% by weight was about 50 hours, and yet the resulting concentrated solution contained a further larger amount of coherent matter mixed therein than that in the first time batch. In the case of this type module, back washing could not be carried out, because, when a back pressure was applied, the membrane was peeled off.

COMPARATIVE EXAMPLE 4

Concentration operation of 3% by weight a latex was carried out as in Comparative Example 3, using the apparatus supplied by a company P having the flow sheet same as that shown in FIG. 15, and wherein a spiral type module was installed. About 2 hours after starting operation, the passage of the liquid to be concentrated (raw solution) in the module clogged and continuation of concentration operation became impossible and the test had to be stopped. Further, in the case of this module, back washing could not be carried out, because, when a back pressure was applied, the membrane was broken.

EXAMPLE 2

0.3% by weight latex of styrene-butadiene copolymer (25:75) was batchwise concentrated up to 20% by weight, according to the flow sheet of FIG. 11 and using the same module as in Example 1. The treatment volume per one batch for 0.3% by weight latex was 3 m³, and 1 minute and 45 minutes were set for back washing and filtration, respectively. The flow rate of the liquid to be treated, on the filtration surface of hollow fibers in the module during the filtration was set to 0.7 m/sec. or higher, and during the back washing, forced stirring on the filtration surface of hollow fibers was not particularly carried out.

The permeated liquid was used as back washing water, but the concentration of a dispersing agent for the latex (same as in Example 1) in the permeated solution during the concentration was 30 – 60 ppm. The module according to the present invention was effectively used repeatedly 100 times or more. The time required for one batch concentration was 17 – 20 hours.

EXAMPLE 3

An experiment was carried out for preparing a high concentration latex according to the flow sheet shown in FIG. 11 and using the same module as in Example 1. A latex having an initial concentration of 48% by weight was batchwise concentrated up to 58% by weight. The treatment volume per one batch for 48% by weight latex was 2 m$^3$, and back washing was carried out for 0.5 minutes after every 10 minutes filtration time, using the permeated liquid as back washing water. A dispersing agent for latex (same as in Example 1) was added to the permeated solution used for back washing in an amount sufficient to give a concentration of 1,000 ppm. During the filtration time, the flow rate of the liquid to be treated, on the filtration surface of hollow fibers in the module was set to 0.7 m/sec. or higher, but, during the back washing time, a forced stirring was not particularly carried out. The module according to the present invention was effectively used repeatedly 32 times or more. The time required for concentrating one batch was 4 – 6 hours.

EXAMPLE 4

Forty % by weight latex was batchwise concentrated up to 50% by weight, according to the flow sheet shown in FIG. 11 and using the same module as in Example 1. The treatment volume per one batch for 40% by weight latex was 3 m$^3$. Back washing was carried out for 1 minute after every 15 minutes filtration, and the flow rare of the liquid to be treated, on the filtration surface of hollow fibers in the module during the filtration time was set to 0.7 m/sec. or higher. During the back washing time, forced stirring on the filtration surface of hollow fibers was not particularly carried out. The permeated liquid was used as back washing water, and the concentration of a dispersing agent for latex (same as in Example 1) in the permeated solution during the concentration time was 100 – 300 ppm. The module according to the present invention was effectively used repeatedly 40 times or more. The time required for concentrating one batch was 15 – 20 hours.

EXAMPLE 5

Three % by weight vinyl acetate latex was concentrated up to 20% by weight in a concentration system, according to the flow sheet shown in FIG. 12 and using the same module as in Example 1 and an apparatus having a treating capacity of 30 m$^3$/day. The resulting latex concentrated up to 20% by weight was continuously taken out to the outside of the concentrating system. During the concentration, the flow rate of the liquid to be treated, in the module was set to 0.7 m/sec. or higher, and back washing was carried out for one minute after every 30 minutes filtration time. Permeated solution was used as back washing solution, and the concentration of a dispersing agent of latex (polyoxyethylene sorbitanmonolauric acid ester) in the permeated solution during the concentration was in the vicinity of 100 ppm.

The module according to the present invention was operated continuously for 150 days or more.

EXAMPLE 6

Forty five % by weight styrene-butadiene (50:50) copolymer latex was concentrated up to 50% by weight in a concentration system, according to the flow sheet shown in FIG. 12 and using the same module as in Example 1 and an apparatus having a treating capacity of 30 m$^3$/day. The resulting latex concentrated up to 50% by weight was continuously taken out to the outside of the concentration system. During the concentration time, the flow rate of the liquid to be treated, in the module was set to 0.7 m/sec. or higher, and back washing was carried out one time for 0.75 minute after every 12 minutes filtration. The permeated liquid was used as back washing liquid, and the concentration of a dispersing agent for latex (same as in Example 1) in the permeated liquid was in the vicinity of 170 ppm. As for the duration time of continuous operation according the module of the present invention, 70 days or more were possible.

The process of the present invention is very meaningful in that it has made feasible to concentrate such kinds of laticies which could not concentrate with a conventional ultrafilter both batchwise or in continuous manner economically, for a long time, due to the latex coating formed by coagulation of concentration-polarized layer. Further, latex concentrates can be obtained without exerting any thermal, dynamical or electrical action upon latexes, i.e. without any degradation in quality, of latexes. In short, according to conventional processes such as evaporation, electrical decantation, centrifugal process, etc., it has been impossible to concentrate synthetic rubber latexes, on account of change in color, cohesion of latexes due to electric charge, break of emulsion due to dynamical stress, etc., but such concentration has become possible by the use of the ultrafilter according to the present invention. Thus, for example, in case of synthetic rubber plant running with a yield of 90% and discharging the balance of 10% as a dilute spent liquor, it has now become possible to elevate the yield up to nearly 100% by recovering the spent liquor according to the present invention. Further, it has also become possible to simplify the treating process of spent liquor of latex to a large extent. Namely, such a step as a conventional cohesion step which produces a large amount of sludge is no more necessary. Furthermore, according to the present invention, it has also become feasible to produce laticies of high concentration which have not been heretofore produced due to the difficulty connected with the polymerization step, i.e. laticies having a concentration very close to a gel point can be prepared.

EXAMPLE 7

Three % by weight styrene-butadiene (50:50) copolymer latex was batchwise concentrated up to 20% by weight, according to the flow sheet shown in FIG. 16.

For the inside pressure type module in the apparatus, hollow fiber having an outer diameter of 3 mm and an inner diameter of 2 mm, prepared from acrylonitrile polymer, was used. The permeability of the hollow fibers relative to pure water was 3.0 m$^3$/m$^2$·day·atm (the area of membrane was calculated based upon the outer wall surface). 600 hollow fibers each having an effective length of 850 mm were held in one module, said fibers being disposed approximately in parallel; and opened at both their ends; and collected there orderly to form a bundle and fixed The effective area of membrane was 4.2 m$^2$. Further, in this module cartridge, four round rods of stainless steel as supporting members were used; said rods were placed outside the bundles of hollow fibers. The treatment volume of one batch for 3% by weight latex was 3 m$^3$, and 0.75 minute of back washing time vs. 20 minutes of filtration time was set. The filtrate was used as back washing liquid, and the concentration of a dispersing agent for latex (same as in Example 1) in the filtrate during the concentration was 75 – 110 ppm. In addition, during the back washing time, force stirring of the liquid to be treated was not particularly carried out on the filtration surface of hollow fibers and only during the filtration time, the flow rate of liquid to be treated, on the surface of hollow fibers, was adjusted to 0.7 – 1 m/sec. The module according to the process of the present invention was used 50 times. The time required for concentrating one batch was 13 – 15 hours.

EXAMPLE 8

Three % by weight vinyl acetate latex was concentrated up to 20% by weight in a concentrating apparatus, according to the flow sheet shown in FIG. 17, using the same module as in Example 7 and an apparatus having a treatment capacity of 30 m$^3$/day. The resulting latex concentrated up to 20% by weight was continuously taken out to the outside of the concentrating apparatus. During the concentration, the flow rate of the liquid to be treated, in the ultrafiltration unit was set to 0.7 m/sec., and back washing was carried out at a rate of one minute per 30 minutes of filtration time. The filtrate was used as back washing liquid, and a dispersing agent for latex (same as in Example 5) contained in the back washing liquid was 100 ppm. Continuous operation of the module according to the process of the present invention was carried out for 80 days.

EXAMPLE 9

Deionized water was used as back washing liquid, and concentration was carried out batchwise under the same conditions as in EXAMPLE 7. A latex coating was formed on the inside surface of the hollow fibers in the ultrafiltration unit, and the unit were used only 6 times (6 batches). The time required for concentrating the first batch was 15 hours and that required for concentrating the sixth batch was 32 hours.

EXAMPLE 10

Deionized water was used as back washing liquid, and continuous concentration was carried out under the same conditions as in Example 8. A latex coating was formed as in Example 9, on the filtration inner surface of the hollow fibers, and the duration time of continuous operation were only 133 hours.

What is claimed is:
1. An ultrafiltration apparatus comprising
   1. a module in which a number of polymeric hollow fibers having semipermeable walls and arranged in approximately parallel are collected orderly to form a bundle and fixed with a cast-molding material at at least one end portion thereof and opened at said end portion to form a module cartridge, said module cartridge is accommodated in a casing provided with an inlet for a liquid to be treated, an outlet for a liquid permeated through said hollow fiber walls and an outlet for a non-permeated liquid and said cast-molding material together with said hollow fiber walls work sealingly as partition between a chamber for to-be-treated liquid and a chamber for the liquid permeated through said hollow fiber walls, said module cartridge being constructed such that great numbers of polymeric hollow fibers, disposed approximately in parallel, are collected orderly to form a bundle and fixed with a cast-molding material at one end and opened at this end but not mutually fixed at the other end resulting in free ends which are not opened and said end part where fibers are collected orderly to form a bundle and are fixed, has a feed inlet for the to-be-treated feed situated at the central part of the bundle of hollow fibers and protruding towards the other end of the hollow fibers,
   2. back washing means having a storage tank of permeated liquid for sending said permeated liquid to said module and
   3. control means for controlling said module and said back washing means.

* * * * *